United States Patent
Sato et al.

(10) Patent No.: US 10,030,311 B2
(45) Date of Patent: Jul. 24, 2018

(54) HYDROGEN GENERATION ELECTRODE AND ARTIFICIAL PHOTOSYNTHESIS MODULE

(71) Applicants: FUJIFILM Corporation, Tokyo (JP); Japan Technological Research Association of Artificial Photosynthetic Chemical Process, Tokyo (JP); THE UNIVERSITY OF TOKYO, Tokyo (JP)

(72) Inventors: Naotoshi Sato, Ashigara-kami-gun (JP); Kazunari Domen, Tokyo (JP)

(73) Assignees: FUJIFILM Corporation, Tokyo (JP); Japan Technological Research Association of Artificial Photosynthetic Chemical Process, Tokyo (JP); The University of Tokyo, Tokyo (JP)

( * ) Notice: Subject to any disclaimer, the term of this patent is extended or adjusted under 35 U.S.C. 154(b) by 17 days.

(21) Appl. No.: 15/413,717

(22) Filed: Jan. 24, 2017

(65) Prior Publication Data

US 2017/0130346 A1 May 11, 2017

Related U.S. Application Data

(63) Continuation of application No. PCT/JP2015/070140, filed on Jul. 14, 2015.

(30) Foreign Application Priority Data

Aug. 11, 2014 (JP) .................................. 2014-163668
Mar. 30, 2015 (JP) .................................. 2015-069478

(51) Int. Cl.
*C25B 1/04* (2006.01)
*C25B 1/02* (2006.01)
(Continued)

(52) U.S. Cl.
CPC .......... *C25B 11/0405* (2013.01); *C25B 1/003* (2013.01); *C25B 9/06* (2013.01); *C25B 11/0478* (2013.01); *H01G 9/2045* (2013.01)

(58) Field of Classification Search
CPC .. C25B 1/003; C25B 1/04; C25B 9/08; C25B 11/0478; C25B 1/02; C25B 9/00; C25B 9/06; C25B 1/00
(Continued)

(56) References Cited

U.S. PATENT DOCUMENTS

2010/0072075 A1   3/2010  Shindo et al.
2010/0221547 A1*  9/2010  Nakayama .......... H01L 51/5016
                                                      428/411.1
(Continued)

FOREIGN PATENT DOCUMENTS

JP    2012-1420 A    1/2012
JP    2012-188683 A    10/2012
(Continued)

OTHER PUBLICATIONS

International Preliminary Report on Patentability issued in PCT/JP2015/070140 (PCT/IB/338 and PCT/IPEA/409) dated Feb. 15, 2017.
(Continued)

*Primary Examiner* — Zulmariam Mendez
(74) *Attorney, Agent, or Firm* — Birch, Stewart, Kolasch & Birch, LLP

(57) ABSTRACT

A hydrogen generation electrode is used for an artificial photosynthesis module that decomposes an electrolytic aqueous solution into hydrogen and oxygen with light. The hydrogen generation electrode has a conductive layer, an inorganic semiconductor layer that is provided on the conductive layer and has a pn junction, and a functional layer (Continued)

that covers an inorganic semiconductor layer. The steam permeability of the functional layer is 5 g/(m²·day) or less.

20 Claims, 5 Drawing Sheets

(51) Int. Cl.
   *C25B 11/04* (2006.01)
   *C25B 9/06* (2006.01)
   *C25B 1/00* (2006.01)
   *H01G 9/20* (2006.01)

(58) Field of Classification Search
   USPC .......................................... 205/340; 204/248
   See application file for complete search history.

(56) References Cited

U.S. PATENT DOCUMENTS

2012/0292618 A1   11/2012   Nomura et al.
2013/0068296 A1   3/2013   Yoshida et al.
2014/0209456 A1   7/2014   Kim et al.
2015/0068915 A1*  3/2015   Hoch .................... C25B 1/04
                                                       205/340

FOREIGN PATENT DOCUMENTS

WO   WO 2008/117649 A1   10/2008
WO   WO 2011/108271 A1   9/2011

OTHER PUBLICATIONS

International Search Report issued in PCT/JP2015/070140 (PCT/ISA/210), dated Oct. 6, 2015.
Written Opinion of the International Searching Authority issued in PCT/JP2015/070140 (PCT/ISA/237), dated Oct. 6, 2015.

* cited by examiner

HYDROGEN GENERATION ELECTRODE AND ARTIFICIAL PHOTOSYNTHESIS MODULE

CROSS-REFERENCE TO RELATED APPLICATIONS

This application is a Continuation of PCT International Application No. PCT/JP2015/070140 filed on Jul. 14, 2015, which claims priority under 35 U.S.C. § 119(a) to Japanese Patent Application No. 2014-163668 filed on Aug. 11, 2014 and Japanese Patent Application No. 2015-069478 filed on Mar. 30, 2015. Each of the above application(s) is hereby expressly incorporated by reference, in its entirety, into the present application.

BACKGROUND OF THE INVENTION

1. Field of the Invention

The present invention relates to a hydrogen generation electrode used for an artificial photosynthesis module that decomposes an electrolytic aqueous solution into hydrogen and oxygen by light, and an artificial photosynthesis module including this hydrogen generation electrode.

2. Description of the Related Art

In the related art, as one of the forms in which solar light energy that is renewable energy is utilized, devices that use a photoelectric conversion material used for solar batteries and decompose an electrolytic aqueous solution to produce oxygen and hydrogen utilizing an electromotive force obtained with this photoelectric conversion material are suggested (for example, refer to JP-2012-1420A).

JP-2012-1420A describes a solar battery integral gas producing apparatus including a photoelectric conversion part having a light-receiving surface and its back surface, a first electrode for electrolysis that is provided on a back surface side of the photoelectric conversion part and was provided so as to be immersible in an electrolytic aqueous solution, and a second electrode for electrolysis that is provided on the back surface side of the photoelectric conversion part and is provided so as to be immersible in the electrolytic aqueous solution, and a switching part. The first electrode for electrolysis and the second electrode for electrolysis are provided so that the electrolytic solution can be electrolyzed by an electromotive force caused by the photoelectric conversion part receiving light to generate a first gas and a second gas, respectively. The switching part performs switching between a circuit that outputs the electromotive force caused by the photoelectric conversion part receiving light to a first external circuit, and a circuit that outputs the electromotive force caused by the photoelectric conversion part receiving light to the first electrode for electrolysis and the second electrode for electrolysis. One of the first electrode for electrolysis and the second electrode for electrolysis is a hydrogen generating unit that generates hydrogen from the electrolytic aqueous solution, and the other is an oxygen generating unit that generates oxygen from the electrolytic aqueous solution. Forming a pn junction using copper indium gallium (di) selenide (CIGS) or the like as the photoelectric conversion part is mentioned in JP-2012-1420A.

SUMMARY OF THE INVENTION

In the solar battery integral gas producing apparatus of JP-2012-1420A, the first electrode for electrolysis, and the second electrode for electrolysis are immersed in the electrolytic aqueous solution, and the photoelectric conversion part having the pn junction is not immersed in the electrolytic aqueous solution. However, if the photoelectric conversion part having the first electrode for electrolysis and the pn junction is immersed in the electrolytic aqueous solution and driven for a long time, there is a problem that bubbles are formed inside the photoelectric conversion part, the photoelectric conversion part is destructed because the bubbles grow large, and durability degrades.

An object of the invention is to solve the problems on the basis of the aforementioned related art, and provide a hydrogen generation electrode that has excellent durability even in a case where the hydrogen generation electrode having a pn junction for generating hydrogen is used.

Additionally, an object of the invention is also to provide an artificial photosynthesis module including the above hydrogen generation electrode.

In order to achieve the above object, the invention provides a hydrogen generation electrode for an artificial photosynthesis module that decomposes an electrolytic aqueous solution into hydrogen and oxygen with light, the hydrogen generation electrode comprising: a conductive layer; an inorganic semiconductor layer that is provided on the conductive layer and has a pn junction; and a functional layer that covers the inorganic semiconductor layer, wherein the functional layer is made of amorphous ITO, a steam permeability of the functional layer is 5 $g/(m^2 \cdot day)$ or less, and the functional layer is in contact with the electrolytic aqueous solution.

Additionally, the invention also provides a hydrogen generation electrode for an artificial photosynthesis module that decomposes an electrolytic aqueous solution into hydrogen and oxygen with light, the hydrogen generation electrode comprising: a conductive layer; an inorganic semiconductor layer that is provided on the conductive layer and has a pn junction; and a functional layer that covers the inorganic semiconductor layer, wherein the functional layer includes a plurality of layers, and has an amorphous ITO layer and at least one layer of an inorganic layer or an organic layer, the amorphous ITO layer is disposed opposite to the inorganic semiconductor layer, a steam permeability of the functional layer is 5 $g/(m^2 \cdot day)$ or less, and the amorphous ITO layer of the functional layer is in contact with the electrolytic aqueous solution.

It is preferable that the functional layer is configured such that the organic layer, the inorganic layer and the amorphous ITO layer are disposed in this order over the conductive layer.

It is preferable that $PV \leq t$ is satisfied when a thickness of the functional layer is t and a peak-valley value in a surface of the inorganic semiconductor layer is PV.

It is preferable that the inorganic semiconductor layer includes a CIGS compound semiconductor, a copper zinc tin sulfide (CZTS) compound semiconductor, or a copper gallium selenides (CGSe) compound semiconductor.

The functional layer may also be configured such that platinum is carried as a co-catalyst on a surface of the functional layer.

Additionally, the invention also provides an artificial photosynthesis module comprising the above hydrogen generation electrode and an oxygen generation electrode.

According to the invention, the hydrogen generation electrode, which is suitable for the artificial photosynthesis module that decomposes the electrolytic aqueous solution into hydrogen and oxygen with light and is excellent in durability, can be obtained.

Additionally, according to the invention, the artificial photosynthesis module including the above hydrogen generation electrode can also be obtained.

DESCRIPTION OF THE PREFERRED EMBODIMENTS

Hereinafter, a hydrogen generation electrode related to the invention will be described in detail on the basis of a preferable embodiment illustrated in the attached drawings.

In addition, in the invention, "to" showing a numerical range includes numerical values described in on both sides thereof. For example, x being a numerical value A to a numerical value B means that the range of x is a range including the numerical value A and the numerical value B, and if these is expressed by mathematical symbols, $A \leq x \leq B$ is satisfied.

Figure 1:
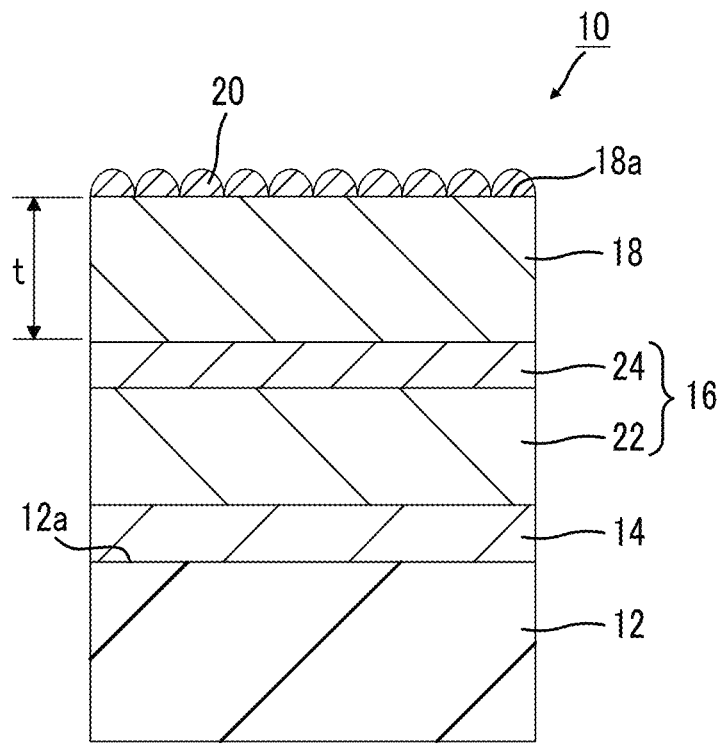
FIG. 1 is a schematic sectional view illustrating the configuration of a hydrogen generation electrode of the embodiment of the invention.
Figure 2:
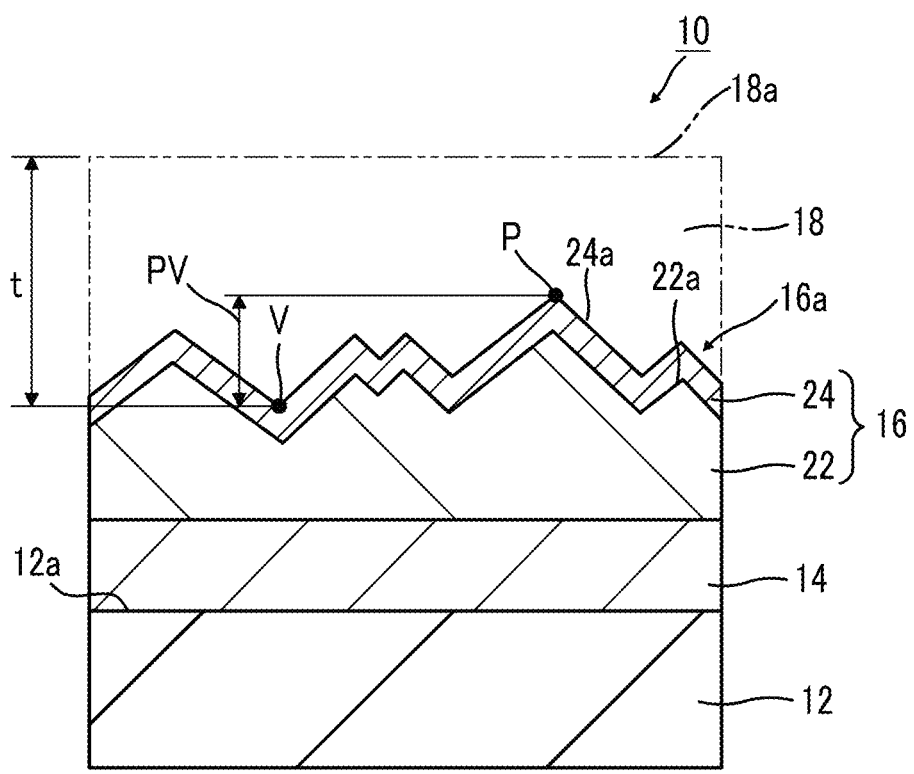
FIG. 2 is an enlarged view of main parts of the hydrogen generation electrode illustrated in FIG. 1.

FIG. 1 is a schematic sectional view illustrating the configuration of the hydrogen generation electrode of the embodiment of the invention, and FIG. 2 is an enlarged view of main parts of the hydrogen generation electrode illustrated in FIG. 1.

A hydrogen generation electrode 10 is formed on an insulating substrate 12, and has a conductive layer 14, an inorganic semiconductor layer 16, and a functional layer 18. At the time of hydrogen generation, hydrogen is generated with the hydrogen generation electrode 10 in contact with an electrolytic aqueous solution.

The insulating substrate 12 is configured to support the hydrogen generation electrode 10 and have electrical insulation. Although the insulating substrate 12 is not particularly limited, for example, a soda lime glass substrate (hereinafter referred to as SLG substrate) or a ceramic substrate can be used. Additionally, an insulating substrate in which an insulating layer is formed on a metal substrate can be used as the insulating substrate 12. Here, as the metal substrate, a metal substrate or a composite metal substrate is available. As the metal substrate, an Al substrate or a steel use stainless (SUS) substrate is able to be used as an example. As the composite metal substrate, a composite metal substrate, such as a composite Al substrate made of a composite material of Al, and for example, other metal, such as SUS, is available. In addition, the composite metal substrate is a kind of the metal substrate, and the metal substrate and the composite metal substrate are collectively and simply referred to as a metal substrate. Moreover, a metal substrate with an insulating film having an insulating layer formed by anodizing a surface of the Al substrate or the like can also be used as the insulating substrate 12. The insulating substrate 12 may be flexible or may not be flexible. In addition, in addition to the above-described substrates, for example, a glass plate, such as high strain point glass or non-alkali glass, or a polyimide substrate can also be used as the insulating substrate 12.

The thickness of the insulating substrate 12 is not particularly limited, just has to be 20 μm to 20000 μm, is preferably 100 μm to 10000 μm, and is more preferably 1000 μm to 5000 μm. In addition, in a case where one including a CIGS compound semiconductor is used as a p-type semiconductor layer 22, photoelectric conversion efficiency is improved if alkali ions (for example, sodium (Na) ions: $Na^+$) are supplied to the insulating substrate 12 side. Thus, it is preferable to provide an alkali supply layer that supplies the alkali ions to a surface 12a of the insulating substrate 12. In addition, in the case of the SLG substrate, the alkali supply layer is unnecessary.

In the hydrogen generation electrode 10 illustrated in FIG. 1, a co-catalyst 20 is formed (disposed) on a surface 18a of the functional layer 18. The co-catalyst 20 may be formed, for example, in the shape of islands so as to be dotted.

The co-catalyst 20 can be formed of single substances constituted with, for example, Pt, Pd, Ni Au, Ag, Ru Cu, Co, Rh, Ir, Mn, or the like, alloys obtained by combining these single substances, and oxides of these single substances, for example, $NiO_x$, and $RuO_2$. Additionally, the particle diameter of the co-catalyst 20 is not particularly limited, and is preferably 0.5 nm to 1 μm.

In addition, methods for forming the co-catalyst 20 are not particularly limited, and the co-catalyst 20 can be formed by a coating baking method, an optical electrodeposition method, a sputtering method, an impregnating method, and the like.

Although it is preferable to provide the co-catalyst 20 on the surface 18a of the functional layer 18, the co-catalyst 20 may not be provided in a case where generation of sufficient hydrogen gas is possible.

The conductive layer 14 applies a voltage to the inorganic semiconductor layer 16. Although the conductive layer 14 is not particularly limited as long as the conductive layer has conductivity, the conductive layer 14 is made of, for example, metals, such as Mo, Cr, and W, or combinations thereof. The conductive layer 14 may have a single-layer structure, or may have a laminated structure, such as a two-layer structure. Among these, it is preferable that the conductive layer 14 is made of Mo. Although the film thickness of the conductive layer 14 is generally about 800 nm, it is preferable that the thickness of the conductive layer 14 is preferably 400 nm to 1 μm.

The inorganic semiconductor layer 16 generates an electromotive force. The inorganic semiconductor layer 16 has the p-type semiconductor layer 22 and an n-type semiconductor layer 24, and the p-type semiconductor layer 22 forms a pn junction at an interface between p-type semiconductor layer 22 and the n-type semiconductor layer 24.

The inorganic semiconductor layer 16 is a layer that absorbs the light which has been transmitted through the functional layer 18 and the n-type semiconductor layer 24 and has reached the inorganic semiconductor layer, and generates holes on a p side and electrons on an n side. The p-type semiconductor layer 22 has a photoelectric conversion function. In the p-type semiconductor layer 22, holes generated in the pn junction are moved from the p-type semiconductor layer 22 to the conductive layer 14 side, and electrons generated in the pn junction are moved from the n-type semiconductor layer 24 to the functional layer 18 side. As for the film thickness of the p-type semiconductor layer 22, 0.5 µm to 3.0 µm is preferable, and 1.0 µm to 2.0 µm is particularly preferable.

It is preferable that the p-type semiconductor layer 22 is constituted with, for example, a CIGS compound semiconductor or a CZTS compound semiconductor of $Cu_2ZnSnS_4$ or the like, which has a chalcopyrite crystal structure. The CIGS compound semiconductor layer may be constituted with $CuInSe_2$ (CIS), $CuGaSe_2$ (CGS), or the like as well as $Cu(In, Ga)Se_2$ (CIGS).

In addition, as methods for forming the CIGS layer, 1) a multi-source vapor deposition method, 2) a selenide method, 3) a sputtering method, 4) a hybrid sputtering method, 5) a mechanochemical process method, and the like are known.

Other methods for forming the CIGS layer include a screen printing method, a proximity sublimating method, a metal organic chemical vapor deposition (MOCVD) method, a spraying method (wet film-forming method), and the like. For example, in the screen printing method (wet film-forming method), a spray method (wet film-forming method), a molecular beam epitaxy (molecular beam epitaxy (MBE)) method, or the like, crystal having a desired composition can be obtained by forming a particulate film including an 11 group element, a 13 group element, and a 16 group element on a substrate, and executing thermal decomposition processing (may be thermal decomposition processing in a 16 group element atmosphere in this case) or the like (JP1997-74065A (JP-H09-74065A), JP1997-74213 (JP-H09-74213A), or the like).

The n-type semiconductor layer 24 is formed in order to cause the light having entered the functional layer 18 to be transmitted up to the p-type semiconductor layer 22.

It is preferable that the n-type semiconductor layer 24 is formed of one including metal sulfide including at least one kind of metallic element selected from a group consisting of, for example, Cd, Zn, Sn, and In, such as CdS, ZnS, Zn(S, O), and/or Zn (S, O, OH), SnS, Sn(S, O), and/or Sn(S, O, OH), InS, In (S, O), and/or In (S, O, OH). The film thickness of the n-type semiconductor layer 24 is preferably 10 nm to 2 µm, and more preferably, 15 nm to 200 nm. The n-type semiconductor layer 24 is formed by, for example, a chemical bath deposition method (hereinafter referred to as a CBD method).

In addition, a window layer, for example, may be provided between the n-type semiconductor layer 24 and the functional layer 18. This window layer is constituted with, for example, a ZnO layer with a thickness of about 10 nm.

The functional layer 18 prevents entering of moisture into the inside of the inorganic semiconductor layer 16, and inhibits formation of bubbles inside the inorganic semiconductor layer 16. Transparency, water resistance, water impermeability, and conductivity are required for the functional layer 18. The durability of the hydrogen generation electrode 10 improves by the functional layer 18.

The functional layer 18 is formed so as to cover the inorganic semiconductor layer 16. It is preferable that covering the inorganic semiconductor layer 16 has a coverage of 100%. However, if the coverage is at least 80%, it is said that the inorganic semiconductor layer 16 is covered. The coverage can be obtained, for example, by measuring the surface of the functional layer 18 in a plurality of places using X-rays photoelectron spectroscopy and on the basis of a frequency at which elements of the inorganic semiconductor layer 16 are detected within the measurement results.

The steam permeability of the functional layer 18 is 5 $g/(m^2 \cdot day)$ or less. Especially, 3 $g/(m^2 \cdot day)$ or less is preferable, and 1.5 $g/(m^2 \cdot day)$ or less is more preferable. Although a lower limit is not particularly limited, it is often the case that the lower limit is $1 \times 10^{-8}$ $g/(m^2 \cdot day)$ or more from a viewpoint of material characteristics.

The steam permeability has a value measured in the functional layer 18 that is a single body, and can be measured by the Mocon method. For example, the functional layer 18 can be formed of a resin film, such as a polyethylene terephthalate (PET) film, and in this state, the steam permeability can be measured by the Mocon method.

The functional layer 18 cannot sufficiently prevent entering of moisture into the inside of the inorganic semiconductor layer 16 if the steam permeability exceeds 5 $g/(m^2 \cdot day)$. In addition, the functional layer 18 is formed by, for example, amorphous ITO.

In addition, as a measuring method using the above Mocon method, measuring is performed using a steam permeation testing machine AQUATRAN2 (made by MOCON) under the condition of a relative humidity of 90% at an ambient temperature of 40° C.

It is preferable because the inorganic semiconductor layer 16 can be reliably covered by setting the thickness t of the functional layer 18 as follows. Here, as illustrated in FIG. 2, in a section of the inorganic semiconductor layer 16, when a valley portion on a surface 16a is V and a peak portion is P, the distance of the valley portion V and the peak portion P is referred to as a peak-valley value, and the peak-valley value is represented as PV. As illustrated in FIG. 2, the valley portion V is a place nearest to the surface 12a of the insulating substrate 12 on a surface 24a of the n-type semiconductor layer 24. The peak portion P is a place farthest from the surface 12a of the insulating substrate 12 on the surface 24a of the n-type semiconductor layer 24.

The peak portion P and the valley portion V can be obtained from, for example, an SEM image of the section of the inorganic semiconductor layer 16.

Regarding the functional layer 18, the inorganic semiconductor layer 16 can be reliably covered by satisfying PV≤t, that is, setting the thickness t of the functional layer 18 to the peak-valley value or more. That is, the coverage is 100%.

The thickness t of the functional layer 18 is a distance from the valley portion V of the inorganic semiconductor layer 16 to the surface 18a. For example, it is preferable that the thickness t of the functional layer 18 is 500 nm or more if PV is 500 nm.

Figure 3A:
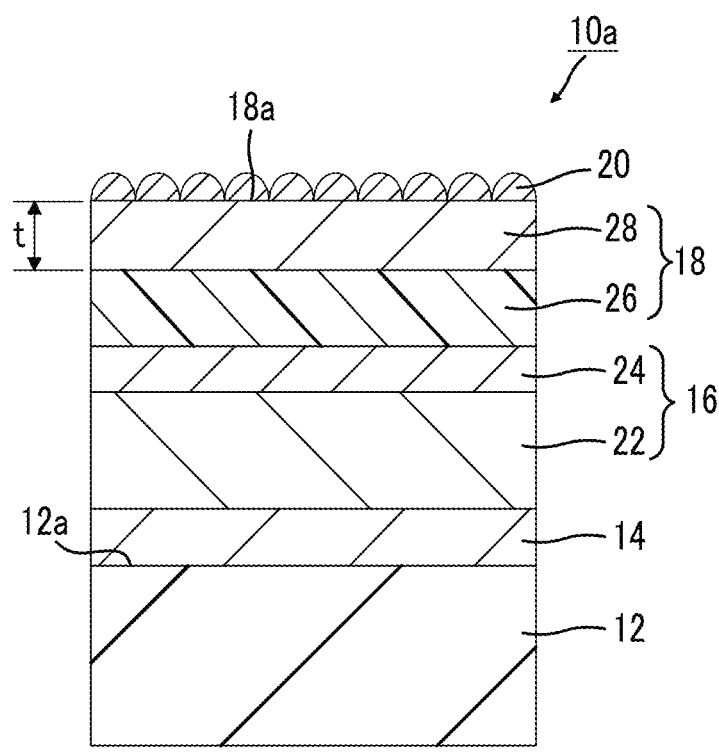
FIG. 3A is a schematic sectional view illustrating another example of the configuration of the hydrogen generation electrode of the embodiment of the invention.

The functional layer 18 may not be limited to being formed of, for example, an amorphous ITO layer that is a single layer, and may be a plurality of layers. For example, the functional layer 18 may have a two-layer structure as in a hydrogen generation electrode 10a as illustrated in FIG. 3A. In this case, the functional layer 18 is constituted with an inorganic layer 26 and an amorphous ITO layer 28. The inorganic layer 26 is disposed on the inorganic semiconductor layer 16 side, and the amorphous ITO layer 28 is disposed on a side (the surface of the inorganic layer 26 opposite to the inorganic semiconductor layer 16 side) opposite to the inorganic semiconductor layer 16.

In addition, in the hydrogen generation electrode 10a illustrated in FIG. 3A, the same components as the hydrogen generation electrode 10 illustrated in FIG. 1 will be designated by the same reference signs, and the detailed description thereof will be omitted.

Figure 3B:
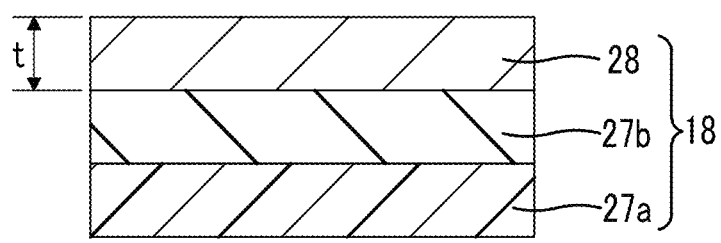
FIG. 3B is a schematic sectional view illustrating another example of a functional layer of the hydrogen generation electrode of the embodiment of the invention.

In the hydrogen generation electrode 10a illustrated in FIG. 3A, the functional layer 18 of the inorganic layer 26 and the amorphous ITO layer 28 is adopted. However, the invention is not limited to this, and an organic layer may be disposed instead of the inorganic layer 26. Moreover, as illustrated in FIG. 3B, the functional layer 18 may be constituted with an organic layer 27a, an inorganic layer 27b, and the amorphous ITO layer 28. In this case, the organic layer 27a is disposed on the inorganic semiconductor layer 16 side, and the inorganic layer 27b and the amorphous ITO layer 28 are laminated on the organic layer 27a. The order of the organic layer 27a and the inorganic layer 27b may be reversed.

In addition, the inorganic layer 26 and the inorganic layer 27b are formed of, for example, ZnO. The organic layer 27a is formed of, for example, polythiophene, polyacethylene, polyaniline, polyparaphenylne, polypyrrole, polyparaphenylne vinylene, or the like.

In the hydrogen generation electrode 10, by providing the above-described functional layer 18, entering of moisture into the inside of the inorganic semiconductor layer 16 can be prevented, and formation of bubbles inside the inorganic semiconductor layer 16 is inhibited. Accordingly, destruction of the inorganic semiconductor layer 16 is inhibited, and the durability of the hydrogen generation electrode 10 can be improved.

The hydrogen generation electrode 10 is used for an artificial photosynthesis module that decomposes an electrolytic aqueous solution into hydrogen and oxygen with light.

Hereinafter, the artificial photosynthesis module using the hydrogen generation electrode 10 illustrated in FIG. 1 will be described.

Figure 4:
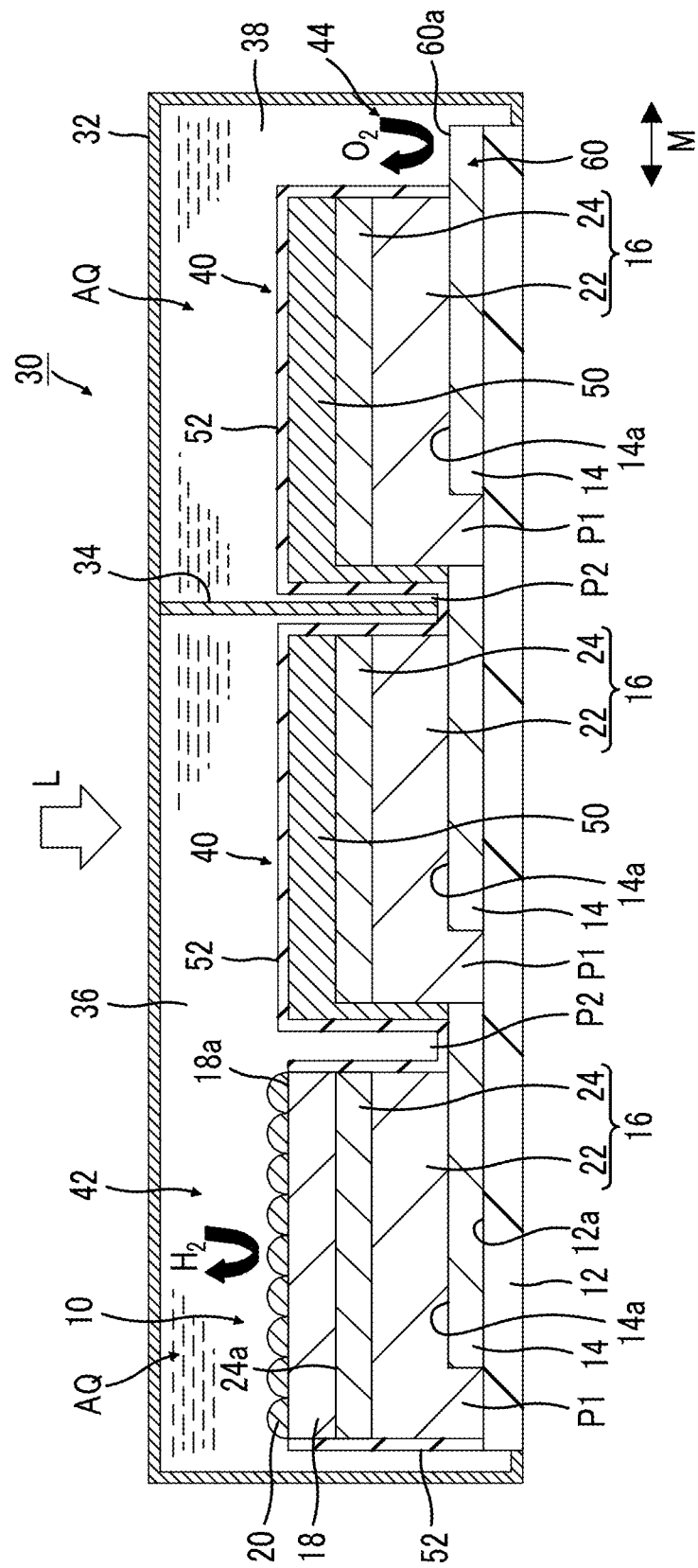
FIG. 4 is a schematic sectional view illustrating the configuration of an artificial photosynthesis module using the hydrogen generation electrode of the embodiment of the invention.

FIG. 4 is a schematic sectional view illustrating the configuration of the artificial photosynthesis module using the hydrogen generation electrode of the embodiment of the invention.

In addition, in the artificial photosynthesis module 30 illustrated in FIG. 4, the same components as the hydrogen generation electrode 10 illustrated in FIG. 1 will be designated by the same reference signs, and the detailed description thereof will be omitted.

In the artificial photosynthesis module 30, an electrolytic chamber 36 for hydrogen and an electrolytic chamber 38 for oxygen are disposed side by side within a container 32 by a partition wall 34. An electrolytic aqueous solution AQ is supplied into the container 32. In order to supply the electrolytic aqueous solution AQ into the container 32, a pipe, a pump, and the like are required, but illustration thereof is omitted.

The container 32 can constitute an outer shell of the artificial photosynthesis module 30, and the configuration thereof is not be particularly limited if the electrolytic aqueous solution AQ can be held inside the container without leaking and light L from the outside can be transmitted through the container.

Here, the electrolytic aqueous solution AQ is, for example, a liquid having $H_2O$ as a main component, and may be distilled water, or may be an aqueous solution using water as a solvent and including a solute. The case of the water may be for example, an electrolytic solution that is an aqueous solution including an electrolyte or may be cooling water using in a cooling tower or the like. The case of the electrolytic solution is, for example, an aqueous solution including an electrolyte, and for example, is strong alkali (KOH), a polymer electrolyte (Nafion (registered trademark)), an electrolytic solution including $H_2SO_4$, a sodium sulfate electrolytic solution, a potassium phosphate buffer solution, or the like.

The partition wall 34 is provided for isolate hydrogen gas generated in the electrolytic chamber 36 for hydrogen and oxygen gas generated in the electrolytic chamber 38 for oxygen from each other so as not to be mixed together. For this reason, if the partition wall 34 has the above-described isolation function, the configuration thereof is not particularly limited.

In addition, the partition wall 34 may be provided for separating the inside of the container 32 into the electrolytic chamber 36 for hydrogen and the electrolytic chamber 38 for oxygen in order to pass hydroxy ions and hydrogen ions therethrough such that the hydroxy ions (pH also increases) that have increased due to generation of hydrogen within the electrolytic chamber 36 for hydrogen, and the hydrogen ions (pH decreases) that have increased due to generation of oxygen within the electrolytic chamber 38 for oxygen neutralize. In this case, the partition wall 34 is configured to have, for example, ion permeability and gas non-permeability. Specifically, the partition wall is made of, for example, an ion exchange membrane, a ceramic filter, porous glass, or the like. The thickness of the partition wall 34 is not particularly limited, and is preferably 10 μm to 1000 μm.

In the artificial photosynthesis module 30, for example, two photoelectric conversion units 40, a hydrogen gas generating parts 42, and an oxygen gas generating part 44 are formed on the planar insulating substrate 12, and these are electrically connected in series in a direction M.

A photoelectric conversion unit 40 and the hydrogen gas generating part 42 are disposed in the electrolytic chamber 36 for hydrogen, and a photoelectric conversion unit 40 and the oxygen gas generating part 44 are disposed in the electrolytic chamber 38 for oxygen.

The photoelectric conversion units 40 are provided for receiving light to generate power to supply power for generating hydrogen gas with the hydrogen gas generating part 42 and power for generating oxygen gas with the oxygen gas generating part 44.

Each photoelectric conversion unit 40 is configured such that the conductive layer 14, the p-type semiconductor layer 22, the n-type semiconductor layer 24, a transparent electrode layer 50, and a protective film 52 are laminated sequentially from the insulating substrate 12 side, and has the same configuration as a photoelectric conversion element used for a solar battery.

In the photoelectric conversion unit 40, the inorganic semiconductor layer 16 is constituted with the p-type semiconductor layer 22 and the n-type semiconductor layer 24 as described above, and a pn junction is formed at an interface between the p-type semiconductor layer 22 and the n-type semiconductor layer 24.

The inorganic semiconductor layer 16 is a layer that absorbs the light which has been transmitted through the protective film 52 and the transparent electrode layer 50 and has reached the inorganic semiconductor layer, and generates holes on a p side and electrons on an n side. The p-type semiconductor layer 22 has a photoelectric conversion function. In the p-type semiconductor layer 22, holes generated in the pn junction are moved from the p-type semiconductor layer 22 to the conductive layer 14 side, and electrons generated in the pn junction are moved from the n-type semiconductor layer 24 to the transparent electrode layer 50 side. As for the film thickness of the p-type semiconductor layer 22, 0.5 μm to 3.0 μm is preferable, and 1.0 μm to 2.0 μm is particularly preferable.

Although the two photoelectric conversion units 40 are connected in series in the direction M, the number thereof is not limited and may be one or may be two or more as long as electromotive forces that can generate hydrogen gas and oxygen gas can be obtained. Since a higher voltage can be obtained if a plurality of photoelectric conversion units are connected in series, it is preferable to connect the plurality of photoelectric conversion units in series.

An opening groove P2 that penetrates through the n-type semiconductor layer 24 and the p-type semiconductor layer 22 and reaches a surface of the conductive layer 14 is formed at a position different from a formation position of a separation groove P1 in the direction M between the photoelectric conversion units 40. The partition wall 34 is provided in the opening groove P2.

In the artificial photosynthesis module 30, if the light L enters each photoelectric conversion unit 40 from the protective film 52 side, the light L passes through the protective film 52, each transparent electrode layer 50, and each n-type semiconductor layer 24, an electromotive force is generated in each p-type semiconductor layer 22, and for example, an electric current (movement of holes) that faces from the transparent electrode layer 50 to the conductive layer 14 is generated. For this reason, in the artificial photosynthesis module 30, the hydrogen gas generating part 42 serves as a negative electrode (an electrolysis cathode), and the oxygen gas generating part 44 serves as a positive electrode (electrolysis anode).

In addition, the type (polarity) of generated gas in the artificial photosynthesis module 30 changes appropriately according to the configuration of each photoelectric conversion unit, the configuration of the artificial photosynthesis module 30, or the like.

The protective film 52 is insoluble in a weak acidic solution and a weak alkaline solution, and has light permeability, water impermeability, and insulation.

The protective film 52 has translucency and is provided to protect the photoelectric conversion units 40, specifically, to cover portions other than a hydrogen gas generation region within the electrolytic chamber 36 for hydrogen and portions other than an oxygen gas generation region within the electrolytic chamber 38 for oxygen. Specifically, the protective film 52 covers the whole surface of the transparent electrode layer 50, and a side surface of the hydrogen generation electrode 10.

The protective film 52 is made of, for example, $SiO_2$, $SnO_2$, $Nb_2O_5$, $Ta_2O_5$, $Al_2O_3$, $Ga_2O_3$, or the like. Additionally, the thickness of the protective film 52 is not particularly limited, and is preferably 100 nm to 1000 nm.

In addition, methods for forming the protective film 52 are not particularly limited, and the protective film 52 can be formed by a radio frequency (RF) sputtering method, a direct current (DC) reactive sputtering method, the MOCVD method, or the like.

Additionally, the protective film 52 is made of, for example insulating epoxy resin, insulating silicone resin, insulating fluororesin, or the like. In this case, the thickness of the protective film 52 is not particularly limited, and is preferably 2 μm to 1000 μm.

The hydrogen gas generating part 42 is constituted with the above-described hydrogen generation electrode 10, and the side surface thereof is covered with the protective film 52. For this reason, that detailed description thereof will be omitted. The hydrogen generation electrode 10 is immersed in the electrolytic aqueous solution AQ, and the functional layer 18 is contact with the electrolytic aqueous solution AQ. In addition, short circuiting resulting from contact with the electrolytic aqueous solution AQ is prevented by the protective film 52 on the side surface of the hydrogen generation electrode 10.

The hydrogen gas generating part 42 supplies electrons to hydrogen ions (protons) $H^+$ ionized from moisture molecules to generate hydrogen molecules, that is, hydrogen gas ($2H^+ + 2e^- \rightarrow H_2$). The surface 18a of the functional layer 18 functions as the hydrogen gas generation region.

The oxygen gas generating part 44 is constituted of a region 60 of an extending portion of the conductive layer 14 of a right-hand photoelectric conversion unit 40, and the region 60 serves as an oxygen gas generation region.

Specifically, the region 60 of the extending portion of the conductive layer 14 of the photoelectric conversion unit 40 is the oxygen gas generating part 44 that takes out electrons from hydroxy ions $OH^-$ ionized from moisture molecules, and generates oxygen molecules, that is, oxygen gas ($2OH^- \rightarrow H_2O + O_2/2 + 2e^-$), and the surface 60a functions as a gas generation region.

A co-catalyst (not illustrated) for generating oxygen may be formed on the surface 60a of the region 60 of the conductive layer 14, and in this case, the co-catalyst may be forming, for example, in the shape of islands so as to be dotted.

The co-catalyst for generating oxygen is made of, for example, $IrO_2$, $CoO_x$, or the like. Additionally, the particle diameter of the co-catalyst for generating oxygen is not particularly limited, and is preferably 0.5 nm to 1 μm. In addition, methods for forming the co-catalyst for generating oxygen are not particularly limited, and the co-catalyst can be formed by a coating baking method, a dipping method, an impregnating method, a sputtering method, a vapor deposition method, and the like.

As described above, the photoelectric conversion unit 40 functions as a photoelectric conversion element, and has the p-type semiconductor layer 22 and the n-type semiconductor layer 24. Since the p-type semiconductor layer 22 and the n-type semiconductor layer 24 are as described above, the detailed description thereof will be omitted.

In addition, the absorption wavelength of the inorganic semiconductor that forms the p-type semiconductor layer 22 is not particularly limited, if this absorption wavelength is in a wavelength band in which photoelectric conversion is possible. In addition, although the wavelength band may include wavelength bands of solar light or the like, particularly, bands from a visible wavelength band to an infrared wavelength band, it is preferable that an absorption wavelength end thereof includes 800 nm or more, that is, a band up to the infrared wavelength band. This is because solar light energy can be utilized as much as possible. Meanwhile, making the absorption wavelength end long is equivalent to a band gap becoming small. Since this makes it possible to expect that an electromotive force for assisting water decomposition decreases, and consequently makes it possible to expect that the number of connections by which the photoelectric conversion units 40 are connected in series for water decomposition increases. Thus, a longer absorption end is not necessarily better.

The transparent electrode layer 50 has translucency, functions as an electrode that takes light into the p-type semiconductor layer 22, makes a pair with the conductive layer 14, and moves holes and electrons that are generated in the p-type semiconductor layer 22 (an electric current flows), and functions as a transparent conductive film for connecting the two photoelectric conversion units 40 in series.

The transparent electrode layer 50 is made of, for example, ZnO in which Al, B, Ga, In, or the like is doped, or ITO in which Al, B, Ga, In, or the like is doped. The transparent electrode layer 50 may have a single-layer structure, or may have a laminated structure, such as a two-layer structure. Additionally, the thickness of the transparent electrode is not particularly limited and is preferably 0.3 µm to 1 µm.

In addition, methods for forming the transparent electrode are not particularly limited, and it is preferable that the transparent electrode is formed by gaseous phase film-forming methods or a coating method. As gaseous phase film-forming methods, for example, an electron beam deposition method, a sputtering method and a chemical vapor deposition (CVD) method are available.

In addition, it is preferable that the transparent electrode layer 50 of the photoelectric conversion unit 40 and the functional layer 18 of the hydrogen generation electrode 10 have the same composition because the photoelectric conversion unit 40 and the hydrogen generation electrode 10 can simultaneously manufactured. In this case, the transparent electrode layer 50 of the photoelectric conversion unit 40 and the functional layer 18 of the hydrogen generation electrode 10 are made of amorphous ITO, respectively.

Namely, the conductive films for connecting the adjacent photoelectric conversion units 40 in series can be formed by forming opening grooves P2 reaching the surfaces of the conductive layers 14 through laser scribing or mechanical scribing after the n-type semiconductor layers 24 are laminated on the p-type semiconductor layers 22, forming the transparent conductive films constituting the transparent electrode layers 50 on the n-type semiconductor layers 24 so as to fill the opening grooves P2, then removing right portions, in the drawing, of the transparent conductive films within the respective opening grooves P2 through the scribing to form slightly small opening grooves P2 reaching the surfaces of the conductive layers 14 again, and leaving the conductive films that directly connect the conductive layers 14 and the transparent electrode layers 50 of the adjacent photoelectric conversion units 40 together.

Next, a method for manufacturing the artificial photosynthesis module 30 will be described.

In addition, the method for manufacturing the artificial photosynthesis module 30 is not limited to a manufacturing method illustrated below.

First, for example, a soda lime glass substrate serving as the insulating substrate 12 is prepared.

Next, for example, an Mo film or the like serving as the conductive layers 14 is formed on the surface of the insulating substrate 12 by a sputtering method.

Next, for example, the separation grooves P1 extending in the width direction of the insulating substrate 12 are formed by scribing the Mo film at predetermined positions using a laser scribing method. Accordingly, the conductive layers 14 separated from each other by the separation grooves P1 are formed.

Next, for example, a CIGS film is formed as the p-type semiconductor layers 22 so as to cover the conductive layers 14 and fill the separation grooves P1. This CIGS film is formed by one of the aforementioned film-forming methods.

Next, for example, a CdS layer serving as the n-type semiconductor layers 24 is formed on the p-type semiconductor layers 22 by a chemical bath deposition (CBD) method.

Next, the two opening grooves P2, which extend in the width direction of the insulating substrate 12 and reach the surfaces 14a of the conductive layers 14 via the p-type semiconductor layers 22 from the n-type semiconductor layers 24, are formed at positions different from the formation positions of the separation grooves P1, in the direction M. In this case, a laser scribing method or a mechanical scribing method can be used as the scribing method.

Next, for example, ZnO layers serving as the transparent electrode layers 50 to which Al, B, Ga, Sb, or the like is added are formed by a sputtering method or a coating method so as to extend in the width direction of the insulating substrate 12, and fill the opening grooves P2 on the n-type semiconductor layers 24.

Next, two slightly narrow opening grooves P2 that reach the surfaces of the conductive layers 14 are formed again by removing portions of the ZnO layers within the opening grooves P2 as so to leave portions. Accordingly, three laminated bodies are formed. One laminated body serves as the hydrogen generation electrode 10 and the two remaining laminated bodies serve as the photoelectric conversion units 40. A laser scribing method or a mechanical scribing method can be used as the scribing method.

Next, the outer surfaces and side surfaces of the laminated bodies, and for example, an $SiO_2$ film serving as the protective film 52 is formed on the surfaces of the conductive layers 14 of the bottom surfaces of the two opening grooves P2 by an RF sputtering method.

Next, a groove is again formed at a position equivalent to an opening groove P2 between the two laminated bodies, and this groove is provided with the partition wall 34.

Next, the ZnO layer of the photoelectric conversion unit 40 is peeled using a laser scribing method or the mechanical scribing method, and for example, an amorphous ITO layer is formed on the surface 24a of the exposed n-type semiconductor layer 24 as the functional layer 18 by a sputtering method using a patterning mask.

Next, for example, Pt co-catalyst serving as the co-catalyst 20 for generating hydrogen is made to be carried in the surface 18a of the functional layer 18 by, for example, an optical electrodeposition method. Accordingly, the hydrogen generation electrode 10 is formed, and the hydrogen gas generating part 42 is formed.

Next, a deposit on the region 60 of the extending portions of the conductive layer 14 of the photoelectric conversion unit 40 is removed using a laser scribing method or a mechanical scribing method, and the region 60 is exposed. Accordingly, the oxygen gas generating part 44 is formed.

The container 32 with almost the same size as the insulating substrate 12 is prepared, and the insulating substrate 12 in which the photoelectric conversion units 40, the hydrogen gas generating part 42, and the oxygen gas generating part 44 are Ruined is housed within the container 32. Accordingly, the electrolytic chamber 36 for hydrogen and the electrolytic chamber 38 for oxygen are formed by the partition wall 34. In this way, the artificial photosynthesis module 30 can be manufactured.

Since the above-described hydrogen generation electrode 10 is used for the artificial photosynthesis module 30, hydrogen can be stably generated over a long period of time even in a state where the hydrogen gas generating part 42 is immersed in the electrolytic aqueous solution AQ.

Hereinafter, another aspect of the artificial photosynthesis module using the hydrogen generation electrode 10 illustrated in FIG. 1 will be described.

Figure 6:
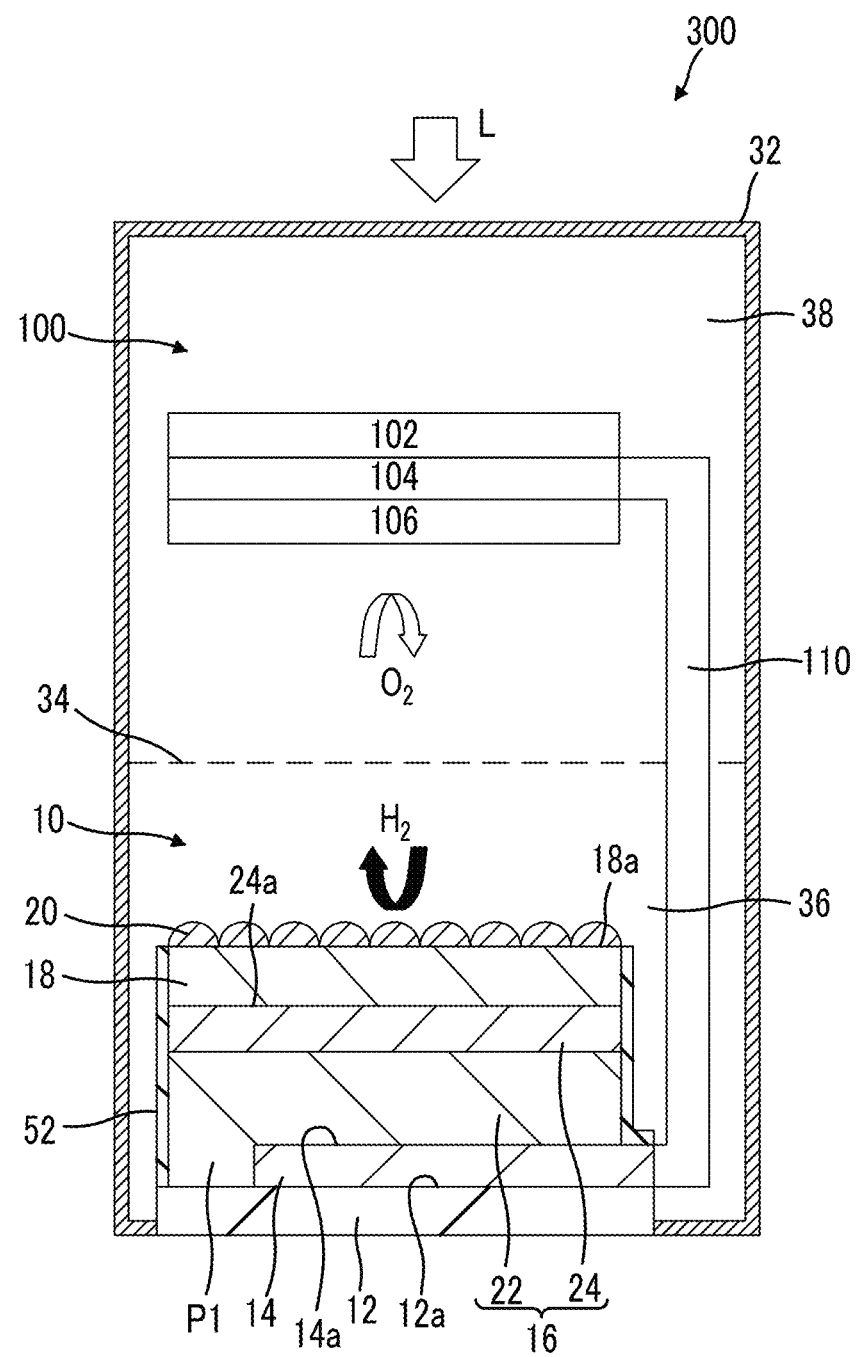
FIG. 6 is a schematic sectional view illustrating the configuration of another aspect of the artificial photosynthesis module using the hydrogen generation electrode of the embodiment of the invention.

FIG. 6 is a schematic sectional view illustrating the configuration of another aspect of the artificial photosynthesis module using the hydrogen generation electrode of the embodiment of the invention.

In addition, in the artificial photosynthesis module 300 illustrated in FIG. 6, the same components as the hydrogen generation electrode 10 illustrated in FIG. 1 will be designated by the same reference signs, and the detailed description thereof will be omitted.

In the artificial photosynthesis module 300, the electrolytic chamber 36 for hydrogen and the electrolytic chamber 38 for oxygen are vertically disposed within inside the container 32 by the partition wall 34. The electrolytic aqueous solution AQ is supplied into the container 32. In order to supply the electrolytic aqueous solution AQ into the container 32, a pipe, a pump, and the like are required, but illustration thereof is omitted.

The artificial photosynthesis module 300 is a so-called tandem module, and an oxygen generation electrode 100 and the hydrogen generation electrode 10 are disposed in this order from a side where the incident light L enters along a light path for the light L (in an upward-downward direction in FIG. 6). In the artificial photosynthesis module 300, the light that has passed through the oxygen generation electrode 100 has a form such that the light is absorbed by the hydrogen generation electrode 10, and this form is excellent in respect of effective use of light.

The oxygen generation electrode 100 is electrically connected to the conductive layer 14 of the hydrogen generation electrode 10 via a conducting wire 110. In addition, the conducting wire 110 is covered with a covering layer (not illustrated) in order to avoid contact with the electrolytic aqueous solution AQ.

The oxygen generation electrode 100 has a transparent substrate 102, a transparent electrode layer 104, and an oxygen generation photocatalyst layer 106 in this order from the side where the light L enters.

As the transparent substrate 102, well-known transparent substrates, such as a glass substrate and a transparent resin film, are used.

The configuration of the transparent electrode layer 104 is the same as the above-described transparent electrode layer 50, and is connected to the conductive layer 14 of the hydrogen generation electrode 10 via the conducting wire 110. As materials that constitute the transparent electrode layer 104, ITO is preferable in a case where emphasis is placed on transmittance and resistance value, and fluorine-doped tin oxide (FTO) is preferable in a case where emphasis is placed on resistance against acid and alkali.

As photocatalysts that constitute the oxygen generation photocatalyst layer 106, well-known photocatalysts can be used, and for example, $SnNb_2O_6$, $WO_3$, $TiO_2$, $NaTaO_3$, $SrTaO_2N$, $CaTaO_2N$, a solid solution of GaN and ZnO, $BiVO_4$ and $BaNbO_2N$, $BaTaO_2N$, $Ta_3N_5$, $LaTiO_2N$, TaON, and the like are included. Especially, $WO_3$, $BiVO_4$, $BaNbO_2N$, $BaTaO_2N$, $Ta_3N_5$, $LaTiO_2N$, and TaON are more preferable, and $WO_3$, $BaTaO_2N$, and $BiVO_4$ is particularly preferable.

In addition, a co-catalyst may be carried on the surface of the oxygen generation photocatalyst layer 106. As examples of the co-catalyst, ferrous oxide, nickel oxide, cobalt oxide, manganese oxide, iridium oxide, ruthenium oxide, and the like are included. These oxides may have a hydroxyl group. Additionally, two or more kinds of co-catalysts may be carried.

In the artificial photosynthesis module 300, if light L enters from the oxygen generation electrode 100 side, a portion of the light L is absorbed, and charge separation is induced in the oxygen generation electrode 100. Among the separated charges, holes takes electrons from water to generate oxygen, and electrons are collected in the transparent electrode layer 104. On the other hand, the light that has not been absorbed by the oxygen generation electrode 100 induces charge separation in the inorganic semiconductor layer 16. Among the separated charges, electrons reach the functional layer 18 to generate hydrogen on the co-catalyst on the surface of the functional layer 18. Holes are collected in the conductive layer 14. Since the transparent electrode layer 104 and the conductive layer 14 of the oxygen generation electrode are connected together with the conducting wire 110, holes and electrons are coupled together again without stagnating. Therefore, oxygen and hydrogen continue being continuously generated while the light L is radiated.

In the artificial photosynthesis module 300, since the hydrogen generation electrode 10 has the same action as the cathode for electrolysis, this hydrogen generation electrode is also referred to as an optical cathode. Since the oxygen generation electrode 100 has the same action as the anode for electrolysis, the oxygen generation electrode is also referred to as an optical anode.

In addition, in the artificial photosynthesis module of the invention, a form in which the p-type semiconductor layer included in the inorganic semiconductor layer in the hydrogen generation electrode is made of CIGS, CZTS, or CGSe, and the oxygen generation photocatalyst layer in the oxygen generation electrode is made of $WO_3$, $BiVO_4$, $BaTaO_2N$, $Ta_3N_5$, $LaTiO_2N$, or TaON is preferable from a viewpoint of action potential matching. Moreover, a form in which the p-type semiconductor layer included in the inorganic semiconductor layer in the hydrogen generation electrode is made of CIGS, CZTS, or CGSe, and the oxygen generation photocatalyst layer in the oxygen generation electrode is made of $WO_3$, $BaTaO_2N$, or $BiVO_4$ is more preferable.

In addition, the artificial photosynthesis module of the invention is not limited to the aspect of FIG. 6, and just has to be a module in which the hydrogen generation electrode and an oxygen generation electrode of the invention are connected together directly or via an auxiliary power source.

The invention is basically configured as described above. Although the hydrogen generation electrode of the invention has been described above in detail, it is natural that the invention is not limited to the above embodiment, and various improvements and modifications may be made without departing from the scope of the invention.

EXAMPLES

Hereinafter, the effects of the hydrogen generation electrode of the invention will be described in detail.

In the present example, in order to confirm the effects of the invention, hydrogen generation electrodes of Example 1 and Comparative Examples 1 to 3 shown below were made.

Regarding defects that have generated on hydrogen generation electrode surfaces after the hydrogen generation electrodes of Example 1 and Comparative Examples 1 to 3 were driven for 24 hours, the numbers of the defects per unit area (1 $cm^2$) were evaluated. These individual evaluation results and the determination results based on these evaluation results are shown in the following Table 1.

As for criteria for determination, a case where the number of generated defects was "0" was defined as "A", and cases where the numbers of defects were those excluding "0" were defined as "B".

In addition, the 24-hour driving was evaluated in a three-electrode system in which the hydrogen generation electrode is irradiated with artificial solar light and a potentiostat is used. The drive conditions of the 24-hour driving are shown below.

Light source: solar simulator (AM1.5G), XES-70S1 made by SAN-EI ELECTRIC CO. LTD
Electrolytic aqueous solution: 0.1M $Na_2SO_4$ pH9.5
Electrochemical measuring device: potentiostat, HZ-5000 made by HUKUTO DENKO CORP.
Reference electrode: Ag/AgCl electrode
Counter electrode: platinum wire
Working electrode: hydrogen generation electrode
Driving potential: 0 V vs. reversible hydrogen electrode (RHE)

Hereinafter, Example 1 and Comparative Examples 1 to 3 will be described.

Example 1

A hydrogen generation electrode of Example 1 has the same configuration as the hydrogen generation electrode 10 illustrated in FIG. 1. The configurations of respective parts are as follows. In the hydrogen generation electrode of Example 1, an exposed portion was covered with epoxy resin and insulated after a conducting wire was connected to a conductive layer.
<Configuration of Hydrogen Generation Electrode>
Insulating substrate: Soda lime glass, 1 mm in thickness
Conductive layer: Mo, 500 nm in thickness
Inorganic semiconductor layer (peak-valley value (PV): 470 nm)
  p-type semiconductor layer: CIGS, 1500 nm in thickness
  n-type semiconductor layer: CdS, 50 nm in thickness
Functional layer: amorphous ITO, 600 nm in thickness (Steam permeability: 1.2 g/($m^2$·day))
Co-catalyst: Pt In addition, as for the peak-valley value, after the formation of the hydrogen generation electrode, a portion of the hydrogen generation electrode was cut, and a sectional scanning electron microscope (SEM) image was obtained.

Then, a peak portion and a valley portion were obtained using the sectional SEM image.

The conductive layer was formed by a sputtering method, the p-type semiconductor layer was formed by a molecular beam epitaxy method (MBE method), the n-type semiconductor layer was formed by a CBD method, and the functional layer was formed by a sputtering method. The co-catalyst was formed with an optical electrodeposition method.

As for the steam permeability, the functional layer was formed of a PET film, and measurement was performed by a Mocon method in this state.

Comparative Example 1

Comparative Example 1 has the same configuration as Example 1 except that the functional layer is not formed as compared to Example 1. According to Comparative Example 1, since the functional layer was not formed, "–" was described in the column of the functional layer, the column of the layer thickness, the column of the coverage of the functional layer, and the column of the steam permeability in the following Table 1.

In addition, in Comparative Example 1, a method for manufacturing a hydrogen generation electrode is the same as that of Example 1 except that the functional layer is not formed. Therefore, the detailed description thereof will be omitted.

Comparative Example 2

Comparative Example 2 has the same configuration as Example 1 except that the configuration of the functional layer is different as compared to Example 1.
Functional layer: amorphous ITO, 60 nm in thickness (steam permeability: 4.8 g/($m^2$·day))

In addition, in Comparative Example 2, a method for manufacturing a hydrogen generation electrode and a method for measuring steam permeability are the same as those of Example 1. Therefore, the detailed description thereof will be omitted.

Comparative Example 3

Comparative Example 3 has the same configuration as Example 1 except that the configuration of the functional layer is different as compared to Example 1.
Functional layer: crystal ITO, 600 nm in thickness (steam permeability: 8.1 g/($m^2$·day))

In addition, in Comparative Example 3, a method for manufacturing a hydrogen generation electrode and a method for measuring steam permeability are the same as those of Example 1. Therefore, the detailed description thereof will be omitted.

TABLE 1

|  | Functional layer | Layer thickness (nm) | Coverage of functional layer (%) | Steam permeability (g/($m^2$ · day)) | Number of generated defects (pieces/$cm^2$) | Determination |
|---|---|---|---|---|---|---|
| Example 1 | Amorphous ITO | 600 | 100 | 1.2 | 0 | A |
| Comparative Example 1 | — | — | — | — | 112 | B |
| Comparative Example 2 | Amorphous ITO | 60 | 40 | 4.8 | 21 | B |
| Comparative Example 3 | Crystal ITO | 600 | 100 | 8.1 | 4 | B |

In Example 1, defects were not generated on the hydrogen generation electrode surface after 24-hour driving, and the number of generated defects per unit area was "0/$cm^2$". In Example 1, a result that bubbles were not generated inside the film was brought about by the functional layer preventing entering of moisture into the inside of the inorganic semiconductor film.

On the other hand, in Comparative Example 1, a large number of defects were generated on the hydrogen generation electrode surface after 24-hour driving, and the number of generated defects per unit area was "112/$cm^2$".

Figure 5A:
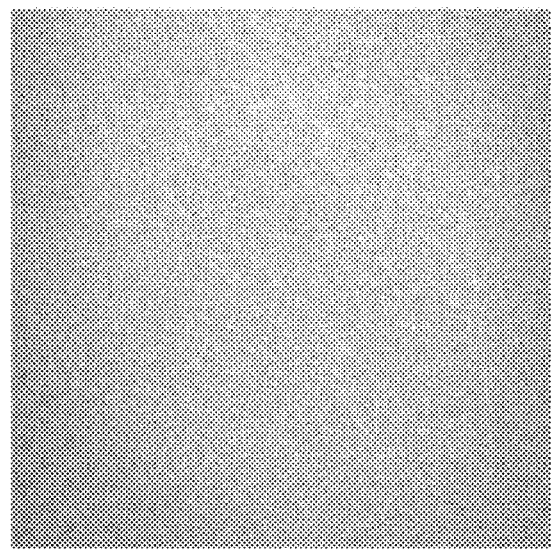
FIG. 5A is a photograph used instead of a drawing illustrating a surface of the hydrogen generation electrode of Example 1 after 24-hour driving.
Figure 5B:
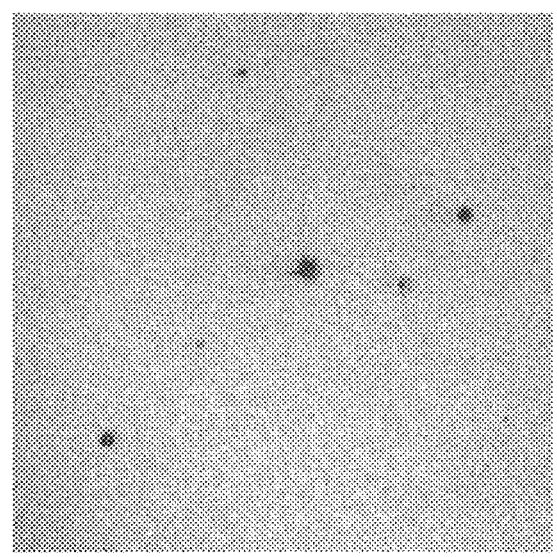
FIG. 5B is a photograph used instead of a drawing illustrating a surface of a hydrogen generation electrode of Comparative Example 1 after 24-hour driving.

The hydrogen generation electrode surface of Example 1 after 24-hour driving is illustrated in FIG. 5A, and the hydrogen generation electrode surface of Comparative Example 1 after 24-hour driving is illustrated in FIG. 5B. Differences between the surfaces of the hydrogen generation electrodes of Example 1 and Comparative Example 1 are clear from FIGS. 5A and 5B. In addition, FIGS. 5A and 5B are respectively obtained with an optical microscope.

In Comparative Example 2, innumerable defects were generated on the hydrogen generation electrode surface after 24-hour driving, and the number of generated defects per unit area was "21/cm$^2$". It is considered that a cause that the defects were generated irrespective of the functional layer being formed is because a portion of the surface of the inorganic semiconductor film having a pn junction was not covered with the functional layer and moisture entered.

In Comparative Example 3, a plurality of defects were generated on the hydrogen generation electrode surface after 24-hour driving, and the number of generated defects per unit area was "4/cm$^2$". It is considered that a cause that the defects were generated irrespective of the functional layer being formed is because the thickness of the functional layer was greater than PV of the inorganic semiconductor film and therefore coating was made completely but the steam permeability was greater than 5 g/(m$^2$·day) and therefore moisture entered.

Example 2

(Making of Oxygen Generation Electrode)

A solution in which 1.0 g of nitric acid bismuth pentahydrate and 3.0 g of sodium iodide were dissolved with 50 ml of nitric acid with pH 1.7 was prepared. This solution was mixed with a solution in which 0.5 g of 1,4-benzoquinone was dissolved in 20 ml of ethanol, and ultrasonic waves were applied to dissolve the obtained solution. The obtained solution was put into a container for electrodeposition (a three-electrode system cell), a working electrode was set in a substrate with a transparent electrode, Ag/AgCl (4M KCl) was set in a reference electrode, and a platinum wire was set in a counter electrode. Electrodeposition was performed for 10 minutes on the working electrode and the reference electrode while maintaining a potential range of −0.1 V to −0.3 V. A BiOI thin film electrode was obtained by drying the electrodeposited electrodes.

Next, after the BiOI thin film electrode was immersed in a dimethyl sulfoxide solution (concentration of 0.2 M) of bis(acetylacetonato) vanadyl, this electrode was baked at 450° C. After the baking, a vanadium oxide that remained on the film surface was removed by being immersed for 30 minutes in 1.0 M of a sodium hydroxide aqueous solution. From the above, an oxygen generation electrode in which a BiVO$_4$ layer was installed in the transparent electrode was made.

(Making of Artificial Photosynthesis Module)

A solution in which 71 g of sodium sulfate, 35.5 g of dibasic sodium phosphate, and 30 g of disodium hydrogenphosphate were dissolved in pure water, and the total amount thereof was 1 L was used as an electrolytic solution. An electrode obtained by cutting the hydrogen generation electrode made in Example 1 in the shape of a square with a light-receiving area of 1.0 cm$^2$ was used as a lower electrode, and an electrode obtained by cutting the oxygen generation electrode made above in the shape of a square with a light-receiving area of 1.0 cm$^2$ was used as an upper electrode, and the upper electrode and the lower electrode were connected to an ammeter. The upper electrode and the lower electrode were buried (immersed) in an optical irradiation cell containing the above electrolytic solution so as to face each other with a gap of 1 cm (refer to FIG. 6). In this case, an oxygen generation surface of the upper electrode is a lower side, and a hydrogen generation surface of the lower electrode is an upper side. Artificial solar light was radiated while stirring the electrolytic solution with a magnetic stirrer. Generation of gas was identified from both the electrodes, and an electric current that flows between an oxygen generation electrode and a hydrogen generation electrode 3 seconds after the start of optical irradiation was 1.2 mA.

EXPLANATION OF REFERENCES

10: hydrogen generation electrode
12: insulating substrate
14: conductive layer
16: inorganic semiconductor layer
18: functional layer
20: co-catalyst
22: p-type semiconductor layer
24: n-type semiconductor layer
26: inorganic layer
27a: organic layer
27b: inorganic layer
28: amorphous ITO layer
30, 300: artificial photosynthesis module
32: container
34: partition wall
36: electrolytic chamber for hydrogen
38: electrolytic chamber for oxygen
40: photoelectric conversion unit
42: hydrogen gas generating part
44: oxygen gas generating part
100: oxygen generation electrode
102: transparent substrate
104: transparent electrode film
106: oxygen generation photocatalyst layer
110: conducting wire

What is claimed is:

1. A hydrogen generation electrode for an artificial photosynthesis module that decomposes an electrolytic aqueous solution into hydrogen and oxygen with light, the hydrogen generation electrode comprising:
a conductive layer;
an inorganic semiconductor layer that is provided on the conductive layer and has a pn junction; and
a functional layer that covers the inorganic semiconductor layer,
wherein the functional layer is made of amorphous ITO,
a steam permeability of the functional layer is 5 g/(m$^2$·day) or less, and
the functional layer is in contact with the electrolytic aqueous solution.

2. A hydrogen generation electrode for an artificial photosynthesis module that decomposes an electrolytic aqueous solution into hydrogen and oxygen with light, the hydrogen generation electrode comprising:
a conductive layer;
an inorganic semiconductor layer that is provided on the conductive layer and has a pn junction; and
a functional layer that covers the inorganic semiconductor layer,
wherein the functional layer includes a plurality of layers, and has an amorphous ITO layer and at least one layer of an inorganic layer or an organic layer,
the amorphous ITO layer is disposed opposite to the inorganic semiconductor layer, a steam permeability of the functional layer is 5 g/(m²·day) or less, and the amorphous ITO layer of the functional layer is in contact with the electrolytic aqueous solution.

3. The hydrogen generation electrode according to claim 2, wherein the functional layer is configured such that the organic layer, the inorganic layer and the amorphous ITO layer are disposed in this order over the conductive layer.

4. The hydrogen generation electrode according to claim 1, wherein PV≤t is satisfied when a thickness of the functional layer is t and a peak-valley value in a surface of the inorganic semiconductor layer is PV.

5. The hydrogen generation electrode according to claim 2, wherein PV≤t is satisfied when a thickness of the functional layer is t and a peak-valley value in a surface of the inorganic semiconductor layer is PV.

6. The hydrogen generation electrode according to claim 3, wherein PV≤t is satisfied when a thickness of the functional layer is t and a peak-valley value in a surface of the inorganic semiconductor layer is PV.

7. The hydrogen generation electrode according to claim 1, wherein the inorganic semiconductor layer includes any one of a CIGS compound semiconductor, a CZTS compound semiconductor and a CGSe compound semiconductor.

8. The hydrogen generation electrode according to claim 2, wherein the inorganic semiconductor layer includes any one of a CIGS compound semiconductor, a CZTS compound semiconductor and a CGSe compound semiconductor.

9. The hydrogen generation electrode according to claim 3, wherein the inorganic semiconductor layer includes any one of a CIGS compound semiconductor, a CZTS compound semiconductor and a CGSe compound semiconductor.

10. The hydrogen generation electrode according to claim 4, wherein the inorganic semiconductor layer includes any one of a CIGS compound semiconductor, a CZTS compound semiconductor and a CGSe compound semiconductor.

11. The hydrogen generation electrode according to claim 5, wherein the inorganic semiconductor layer includes any one of a CIGS compound semiconductor, a CZTS compound semiconductor and a CGSe compound semiconductor.

12. The hydrogen generation electrode according to claim 1, wherein the functional layer has platinum carried as a co-catalyst on a surface thereof.

13. The hydrogen generation electrode according to claim 2, wherein the functional layer has platinum carried as a co-catalyst on a surface thereof.

14. The hydrogen generation electrode according to claim 3, wherein the functional layer has platinum carried as a co-catalyst on a surface thereof.

15. The hydrogen generation electrode according to claim 4, wherein the functional layer has platinum carried as a co-catalyst on a surface thereof.

16. The hydrogen generation electrode according to claim 5, wherein the functional layer has platinum carried as a co-catalyst on a surface thereof.

17. An artificial photosynthesis module comprising:
the hydrogen generation electrode according to claim 1; and
an oxygen generation electrode.

18. An artificial photosynthesis module comprising:
the hydrogen generation electrode according to claim 2; and
an oxygen generation electrode.

19. An artificial photosynthesis module comprising:
the hydrogen generation electrode according to claim 3; and
an oxygen generation electrode.

20. An artificial photosynthesis module comprising:
the hydrogen generation electrode according to claim 4; and
an oxygen generation electrode.

* * * * *